US008073854B2

(12) United States Patent
Whitman et al.

(10) Patent No.: US 8,073,854 B2
(45) Date of Patent: Dec. 6, 2011

(54) DETERMINING THE SIMILARITY OF MUSIC USING CULTURAL AND ACOUSTIC INFORMATION

(75) Inventors: Brian Whitman, Somerville, MA (US); Tristan Jehan, Somerville, MA (US)

(73) Assignee: The Echo Nest Corporation, Somerville, MA (US)

( * ) Notice: Subject to any disclaimer, the term of this patent is extended or adjusted under 35 U.S.C. 154(b) by 364 days.

(21) Appl. No.: 12/101,013

(22) Filed: Apr. 10, 2008

(65) Prior Publication Data
US 2008/0256106 A1      Oct. 16, 2008

Related U.S. Application Data

(60) Provisional application No. 60/922,647, filed on Apr. 10, 2007.

(51) Int. Cl.
G06F 7/00 (2006.01)
G06F 17/30 (2006.01)
(52) U.S. Cl. .......... 707/749; 707/802; 707/916
(58) Field of Classification Search .......... 707/748, 707/749, 758, 802, 916
See application file for complete search history.

(56) References Cited

U.S. PATENT DOCUMENTS

| | | | |
|---|---|---|---|
| 5,918,223 A | 6/1999 | Blum | |
| 6,539,395 B1 * | 3/2003 | Gjerdingen et al. | ... 707/999.102 |
| 6,801,906 B1 * | 10/2004 | Bates et al. | ................. 707/707 |
| 7,013,301 B2 | 3/2006 | Holm | |
| 7,075,000 B2 | 7/2006 | Gang et al. | |
| 7,081,579 B2 | 7/2006 | Alcalde et al. | |
| 7,193,148 B2 | 3/2007 | Cremer | |
| 7,273,978 B2 | 9/2007 | Uhle | |
| 7,277,766 B1 * | 10/2007 | Khan et al. | ................ 700/94 |
| 7,678,984 B1 * | 3/2010 | Lamere | ................. 84/615 |
| 2002/0002899 A1 * | 1/2002 | Gjerdingen et al. | ......... 84/667 |
| 2002/0181711 A1 * | 12/2002 | Logan et al. | ................ 381/1 |
| 2003/0086341 A1 | 5/2003 | Wells et al. | |
| 2004/0199491 A1 | 10/2004 | Bhatt | |
| 2004/0231498 A1 | 11/2004 | Li et al. | |
| 2006/0065102 A1 | 3/2006 | Xu | |
| 2007/0043768 A1 | 2/2007 | Kang et al. | |
| 2007/0106405 A1 * | 5/2007 | Cook et al. | ................ 700/94 |
| 2007/0256093 A1 * | 11/2007 | Hiler | ............... 725/28 |
| 2008/0101762 A1 * | 5/2008 | Kellock et al. | .......... 386/52 |
| 2008/0189330 A1 * | 8/2008 | Hoos et al. | ............ 707/104.1 |
| 2008/0193017 A1 * | 8/2008 | Wilson et al. | ............ 382/190 |

OTHER PUBLICATIONS

Unknown, Sounds Good?, magazine, Jun. 2006, 1 page.
Unknown, Open Fingerprint Implementation Whitepaper Version 8.0, Journal, Mar. 12, 2006, http://creativecommons.org/licenses/by-nc-sa/2.5/, 9 pages.

(Continued)

*Primary Examiner* — Phong Nguyen
(74) *Attorney, Agent, or Firm* — SoCal IP Law Group LLP; Steven C. Sereboff; John E. Gunther

(57) ABSTRACT

There is disclosed a method and storage media for determining the similarity between a first music collection and a second music collection. The similarity may be determined by comparing metadata associated with the first music collection and metadata associated with the second music collection. A plurality of comparison algorithms may be used including at least one of a comparison algorithm based on acoustic metadata and a comparison algorithm based on cultural metadata. The result of the plurality of comparison algorithms may be combined.

16 Claims, 5 Drawing Sheets

OTHER PUBLICATIONS

Ellis, Daniel P.W., et al. The Quest for Ground Truth in Musical Artist Similarity, Proceedings of IRCAM (Instutite for Music/Acoustic Research and Coordination), 2002, Centre Pompidou, Paris France.

Berenzweig, Adam et al., A Large-Scale Evaluation of Acoustic and Subjective Music Similarity Measures, Proceedings of ISMIR (International Conference on Music Information Retrieval), 2003, Johns Hopkins University, Baltimore, MD.

Recht, Ben and Whitman, Brian, Musically Expressive Sound Textures fro Generalized Audio, Proc. of the 6th Int. Conference on Digital Audio Effects (DAFx-03), Sep. 8-11, 2003, London, UK.

Whitman, Brian and Lawrence, Steve, Inferring Descriptions and Similarity for Music from Community Metadata, Proceedings of the 2002 International Computer Music Conference, Gothenburg, Sweden.

Whitman, Brian and Rifkin, Ryan, Musical Query-by-Description as a Multiclass Learning Problem, 2002 IEEE Workshop on Multimedia Signal Processing, Dec. 9-11, 2002, pp. 156-156.

Whitman, Brian, et al. Learning Word Meanings and Descriptive Parameter Spaces from Music, Proceedings of the HLT-NAACL (Human Language Technology Conference) 2003 Workshop on Learning Word Meaning From Non-Linguistic Data, vol. 6, pp. 92-99.

Whitman, Brian, Semantic Rank Reduction of Music Audio, Proceedings of 2003 IEEE Workshop on Appplicatins of Signal Processing to Audio and Acoustics, Oct. 19-22, 2003, New Paltz, NY.

Whitman, Brian, and Ellis, Daniel P.W., Automatic Record Reviews, Proceedings of the 2004 International Symposium on Music Information Retrieval at Universitat Pompeu Fabra, Barcelona, Spain.

* cited by examiner

DETERMINING THE SIMILARITY OF MUSIC USING CULTURAL AND ACOUSTIC INFORMATION

RELATED APPLICATION INFORMATION

This patent claims benefit of the filing date of provisional patent application Ser. No. 60/922,647, filed Apr. 10, 2007, entitled "Combining Cultural and Acoustic Information for Music Understanding".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to methods for comparing music tracks.

2. Description of the Related Art

Current music analysis, personalization, and recommendation systems rely on descriptive metadata describing each song or track. The metadata may be stored in a database and processed to identify, recommend, and/or retrieve similar songs. Present systems may rely on either acoustic metadata or on cultural metadata.

Within this patent, "acoustic metadata" refers to a numerical or mathematical representation of the sound of a track. Acoustic metadata may take the form of one or more vectors, matrices, lists, tables, and other data structures. Acoustic metadata may be derived from analysis of the music signal. One form of acoustic metadata, commonly termed an "acoustic fingerprint", may uniquely identify a specific track. Other forms of acoustic metadata may be formed by compressing the content of a track while retaining some or all of its musical characteristics. Acoustic metadata may include both temporal information such as tempo, rhythm, beats, tatums, or structure, and spectral information such as melody, pitch, harmony, or timbre.

Techniques for deriving acoustic metadata from music signals are known. Since the music signal may be converted into one or more feature vectors, such techniques may be known as "music vectorization". For example, copending patent application Ser. No. 12/061,374, entitled "Method and Apparatus for Automatically Segueing Between Audio Tracks", filed Apr. 2, 2008, describes a method for deriving acoustic metadata wherein a track may be divided into segments and the spectral content of each segment may be compressed into a timbral vector. An acoustic fingerprint, termed a "timbral signature" may then be calculated as the covariance matrix of the timbral vectors. Paragraphs 0030-0035 and 0048-0051 as filed and the associated figures of application Ser. No. 12/061, 374 are incorporated herein by reference. Other methods for deriving acoustic metadata are described in U.S. Pat. No. 5,918,223, U.S. Pat. No. 7,013,301, and U.S. Pat. No. 7,277, 766.

Within this patent, "cultural metadata" refers to text-based information describing listeners' reactions to a track or song. Cultural metadata may be derived from expert opinion such as music reviews or classification of music into genres. Cultural metadata may be derived from listeners through Web sites, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, and the like. Published U.S. patent application US 2007/0240557 A1, the entire content of which is incorporated herein by reference, describes (paragraphs 0034-0041 and the associated figures) a method for extracting cultural metadata from text pages obtained by searching the Internet. U.S. Pat. No. 6,539,395 describes another method for accumulating cultural metadata. Cultural metadata may be obtained through metadata services such as All Media Group (AMG, a unit of Macrovision), Gracenote, and others.

Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist. Copending patent application Ser. No. 12/100,966, entitled "Automatically Acquiring Acoustic and Cultural Information About Music", filed Apr. 20, 2008, the entire content of which is incorporated herein by reference, describes a method for developing description vectors associated with music tracks.

Within this patent, "explicit metadata" refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners. AMG and Gracenote provide explicit metadata (names, credits, product numbers, etc.) and cultural metadata (styles, genres, moods, themes, similar artists and/or songs, rankings, etc.) for a large library of songs or tracks. The metadata available from AMG's Allmusic.com Web site is believed to be generated primarily by a network of hundreds of professional music critics and reviewers.

MusicIP Corporation provides an acoustic fingerprinting service commonly referred to as Music DNS (Digital Naming System). Music DNS calculates acoustic metadata from the content of a track. Music DNS may be used to uniquely identify specific tracks.

Throughout this description, elements appearing in block diagram are assigned three-digit reference designators, where the most significant digit is the figure number and the two least significant digits are specific to the element. An element that is not described in conjunction with a block diagram chart may be presumed to have the same characteristics and function as a previously-described element having a reference designator with the same least significant digits.

Throughout this description, elements appearing in flow charts are assigned three-digit reference designators, where the most significant digit is the figure number and the two least significant digits are specific to the element. An element that is not described in conjunction with a flow chart may be presumed to have the same characteristics and function as a previously-described element having a reference designator with the same least significant digits.

DETAILED DESCRIPTION

Within this patent, the terms "automatically" and "automated" mean "without user intervention". An automated task may be initiated by a user but an automated task, once initiated, proceeds to a conclusion without further user action.

Within this patent, the term "track" is used to describe a unit of audio content such as a song or a section, such as a movement, of a longer musical performance or recording. A track may be recorded and stored on a storage device such as a hard disc drive, and may be a component of a library of audio tracks. A track may be stored in an uncompressed format such as a WAV file, AIFF file, AU file or other uncompressed file format. A track may be stored in a compressed format such as an MP3 file, a WMA file, or other compressed file format. A track may be stored in any known or future audio file format. A track may be stored on an end user's computer, on a web server, or in a database of music files.

Within this patent, the term "algorithm" has the broad definition of a procedure for solving a problem or accomplishing an end. In particular, the phrase "comparison algorithm" encompasses not only the mathematical operations involved in comparing two sets of data but also the selection and preparation of the data being compared.

Description of Apparatus

Figure 1:
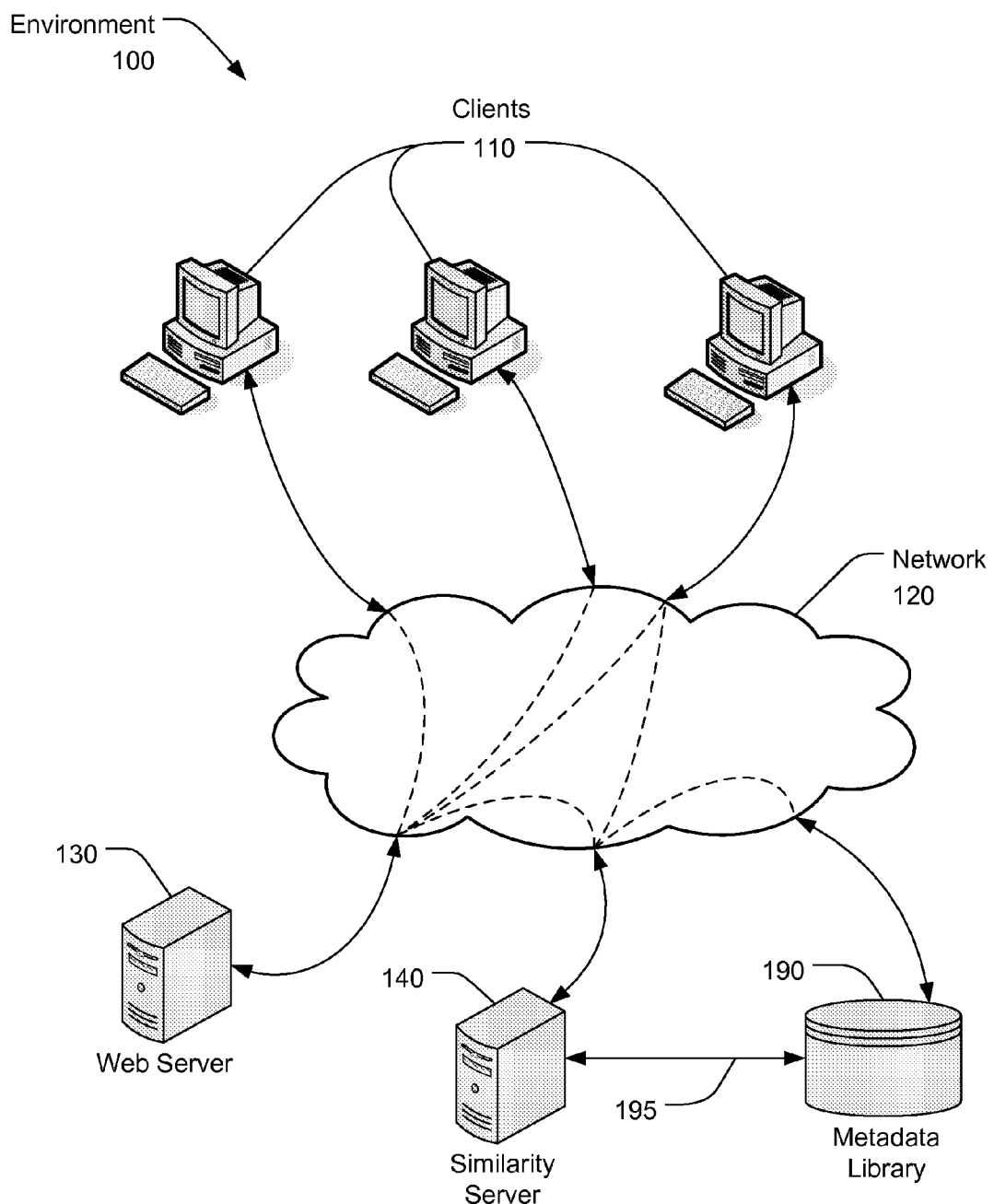
FIG. 1 is a block diagram of an environment.

Referring now to FIG. 1, an environment 100 may include a plurality of clients 110, at least one web server 130, and a similarity server 140 in mutual communication by way of a network 120. A metadata library 190 may be coupled to the similarity server 140 by a link 195. The metadata library 190 may also be couple to and accessible through the network 1220.

Each of the clients 110 may be a computing device operated by a user (not shown). A computing device as used herein refers to any device with a processor and memory that may execute instructions. Computing devices include, but are not limited to, personal computers, server computers, portable computers, laptop computers, computing tablets, set top boxes, audio/video receivers, video game systems, personal video players, personal music players, personal digital assistants (PDAs), cellular telephones, and e-mail clients. These computing devices may run one or more application programs and may run an operating system, including, for example, versions of the Linux, Unix, MS-DOS, Microsoft Windows, Palm OS, Solaris, Symbian, and Apple Mac OS X operating systems.

Each client 110 may include a wired or wireless interface to the network 120. The network 120 may be the Internet or another public or private wide area network or local area network.

The web server 130 may provide a web site that offers music analysis, personalization, recommendation, and/or sales. The web server 130 may interface to the network 120 and may interact with one or more of the clients 110 via the network 120.

The metadata library 190 may store acoustic, cultural, and/or explicit metadata for a large plurality of tracks. Acoustic and cultural metadata may take the form of parameters, lists, matrices, vectors, and other data structures. Acoustic and cultural metadata may be stored as xml files, for example, or any other appropriate file type. Explicit metadata may include numerical, text, pictorial, and other information. Explicit metadata may also be stored in an xml or other file. All or portions of the metadata may be stored in separate files associated with specific tracks. All or portions of the metadata, such as acoustic fingerprints and/or description vectors may be stored in a searchable data structure, such as a k-D tree or other database format.

The similarity server 140 may be adapted to determine the similarly between a first music collection and a second music collection. Within this patent, the first and second music collections will conventionally be referred to as the "target" music collection and the "reference" music collection, respectively, or as the "target" and the "reference" for simplicity. The target may be a song, a track, a portion of a track, or a collection of tracks such as, for example, a playlist or an album. The reference may also be a single track or an album, but may commonly be a larger plurality of tracks. For example, the reference may be a play list including all or selected tracks from a plurality of albums. For further example, the reference may be all or part of an individual user's music collection.

The web server 130 or one of the clients 110 may place a request to the similarity server 140 that identifies a target and a reference and request that the similarity server 140 determine the difference between the target and the reference. The web server 130 or one of the clients 110 may place a request to the similarity server 140 that identifies the reference and requests that the similarity server 140 undertake a search for a target that is similar to the reference. In this case, a plurality of targets may be compared to the reference until one or more targets that are similar to the reference are located.

A request may include a first list of tracks that make up the target and a second list of tracks that make up reference. a request may include links to lists of tracks that make up the target and the reference. Each track may be identified by a human cognizable alphanumeric identifier (such the track title and the artist name or album name), by a unique identifier (such as a publisher catalog number), by a fingerprint derived from the content of each track, or by another identifier. The request may include A request may identify an individual user. The similarity server may be adapted to personalize the comparison or search results to reflect the musical tastes of the identified user. A request that identifies an individual user may also include a list of the user's music collection for use as the reference. A list of the individual user's music collection may be pre-stored at the similarity server or the metadata library, such that, if a reference is not identified in a request, the default reference for an individual user may be the pre-stored list.

In response to the request, the similarity server 140 may determine the similarity of the target and the reference, or may search for a target that is similar to a reference. The similarity server 140 may determine the similarity of a target and a reference, not by comparing the actual digital data comprising the target and reference tracks, but by comparing metadata associated with the target and the reference. The metadata for comparison may be retrieved from the metadata library 190 via the dedicated link 195 or the network 120. The similarity server 140 may determine the similarity of the target and the reference using the processes that will be described subsequently.

Upon determining the similarity between the target and the reference, the similarity server 140 may provide a similarity result to the requester, which may be the web server 130 or one of the clients 110. The similarity result may be a value indicting the similarity of the target and the reference on a predetermined scale. For example the similarity score may be a value between 0 and 1 or 0 and 100, with 0 indicating no similarity between the target and the reference and the maximum value indicating that the same and the reference are highly similar or identical. The similarity result may be expressed as a difference score, where zero may indicate no difference between a target and a reference and a higher value may indicating an increasing degree of difference. The similarity score may be quantized into levels, for example A/B/C/D/E, for reporting the requester. The similarity score may be compared to a predetermined threshold and converted into a binary value, for example Yes/No, for reporting the requester.

Figure 2:
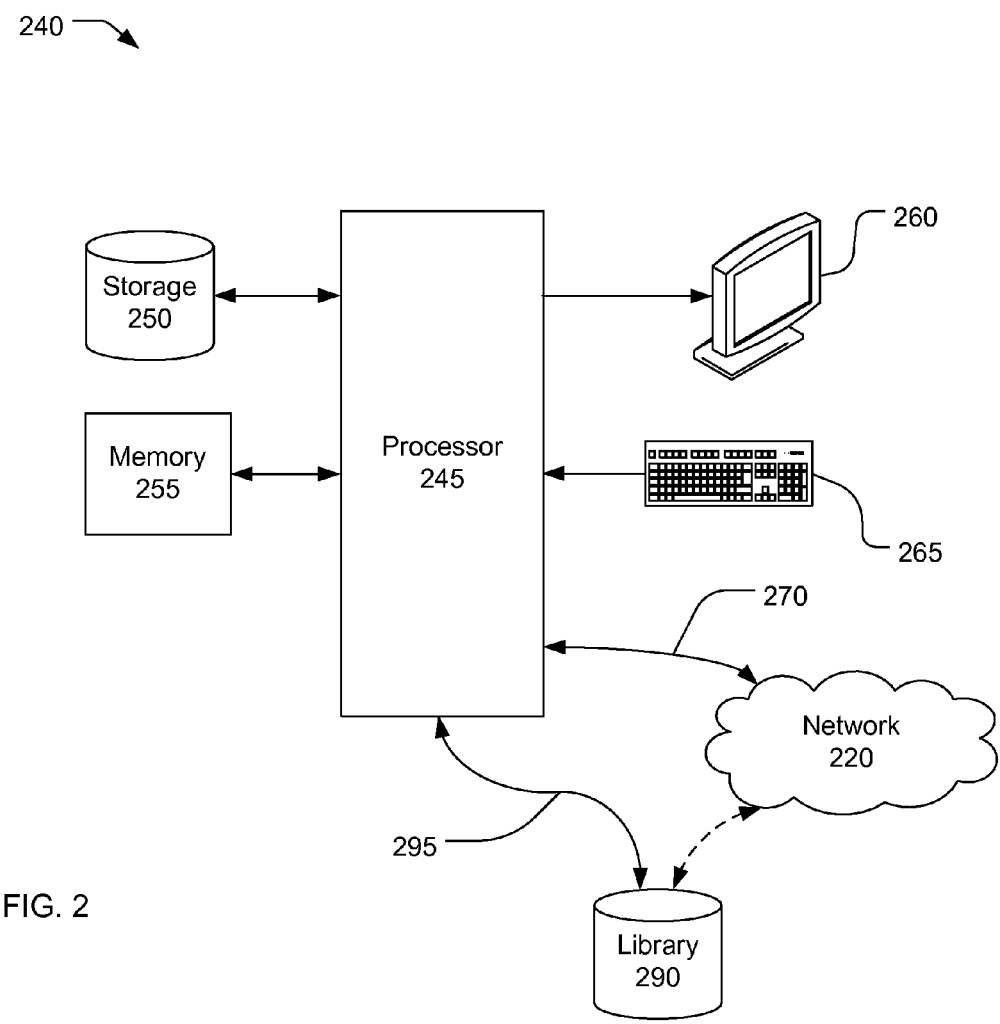
FIG. 2 is a block diagram of a computing device.

FIG. 2 is a block diagram of a computing device 240 that may be suitable for the similarity server 140. The computing device 240 may also be suitable for a client 110 or the web server 130. The computing device 240 may include hardware, firmware, and/or software adapted to perform the processes subsequently described herein.

The computing device 240 may include or interface with a display device 260 and input device 265. The computing device 240 may also interface with one or more networks 220. The interface 270 between the computing device 240 and the network 220 may be wired or wireless. The network 220 may be the Internet or any other private or public network.

When used as a client such as the clients 110, the computing device 240 may also interface with an audio input device (not shown) such as a compact disc player and with an audio output device (not shown) which may include a multi-channel amplifier and speakers. The computing device 240 may store an individual user's music collection and may also store metadata associated with the individual user's music collection.

The computing device 240 may include, or be coupled to, one or more storage devices 250. Each storage device 250 may accept a storage media containing instructions that, when executed, cause the computing device 240 to perform processes that will be described subsequently. These storage media include, for example, magnetic media such as hard disks, floppy disks and tape; optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The computing device 240 may be coupled to or include a metadata library 290 by a dedicated link 295 or via the interface 270 and the network 220. The library 290 may store acoustic, cultural, and/or explicit metadata associated with a large plurality of audio tracks as previously described. The computing device 240 may retrieve metadata from the metadata library 290 as needed to perform the processes subsequently described herein.

Description of Processes

Figure 3:
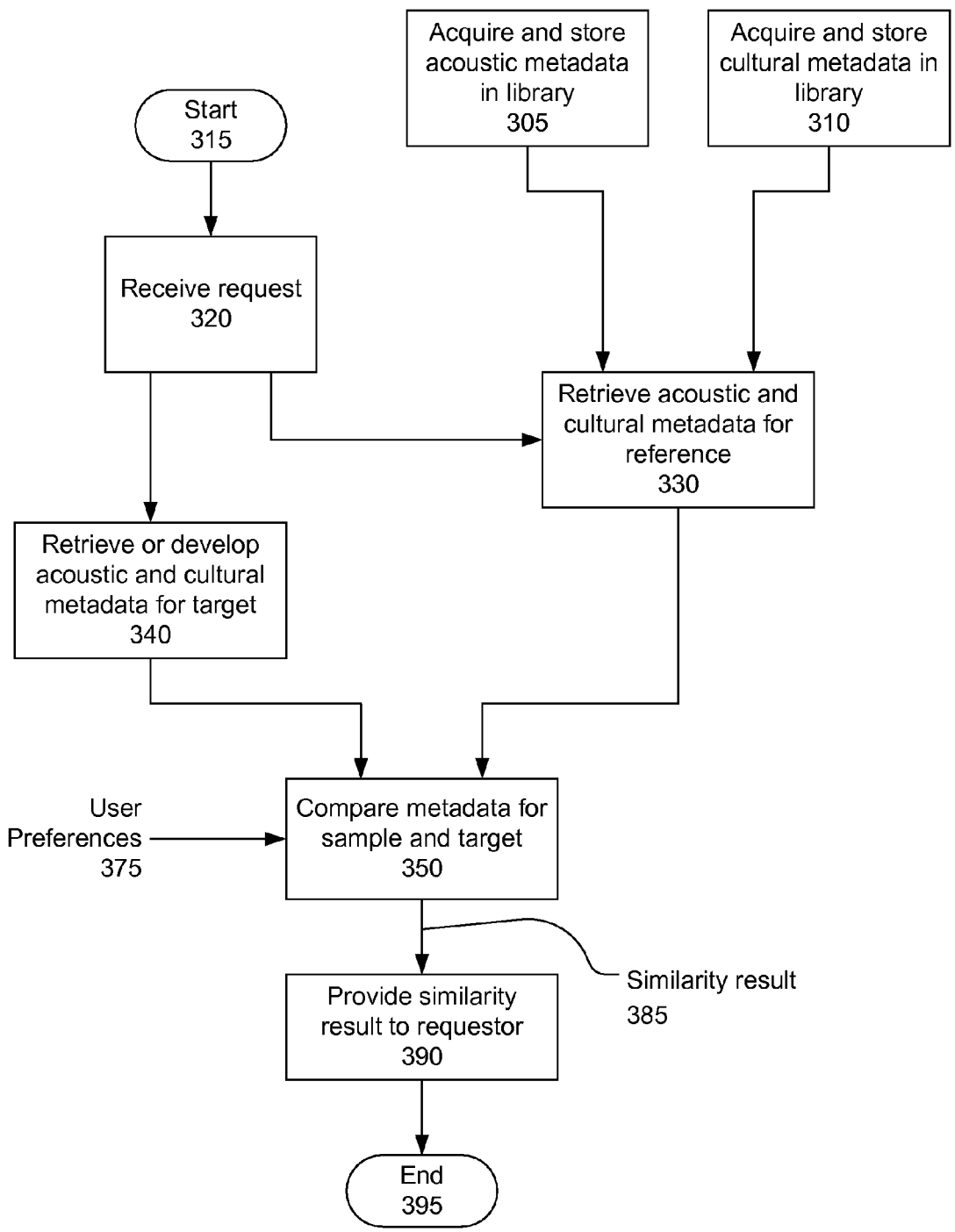
FIG. 3 is a flow chart of an exemplary process to determine the similarity between a target and a reference.

Referring now to FIG. 3, a process 300 for determining the similarity between a target and a reference may be suitable for use by a similarity server such as the similarity server 140. The target may be a track, a portion of a track, or a collection of tracks such as, for example, an album or playlist. The reference may be a single track, a collection of tracks, an album, a playlist or all or selected tracks from a plurality of albums. The reference may be, for example, all or part of an individual user's music collection. The process 300 may determine the similarity between the target and the reference by comparing acoustic and/or cultural metadata associated with the target and the reference.

Before the process 300 for comparing a target to a reference starts at 315, acoustic metadata and cultural metadata for a plurality of audio tracks may have been acquired and stored in a metadata library, such as the metadata library 190, at 305 and 310. Acoustic metadata may be calculated from recorded tracks or provided by third parties. Cultural metadata may be retrieved from web sites, chat rooms, surveys, and the like or may be provided by third parties. Copending patent application Ser. No. 12/100,966, which was previously incorporated herein by reference, describes a method for automatically acquiring acoustic and cultural metadata. The acquisition of acoustic and cultural metadata at 305 and 310 may be continuous, ongoing, and independent of the process from 315 to 395.

A request to determine the similarity between a target and a reference, or to search for a target that is similar to a reference, may be received at 320. The request may identify a target, a user, and a reference. The reference may default to the identified user's record collection if not specified otherwise. The request may be received from a client or a server, such as the clients 110 and web server 130. The request may be received via a network or other communication link.

At 330, acoustic and cultural metadata may be acquired for the reference. Acoustic and cultural metadata for the reference may have been previous calculated or acquired and stored in a metadata library. At 330, previously stored acoustic and cultural metadata for the reference may be retrieved from the metadata library.

At 340, acoustic and cultural metadata may be acquired for the target. The acoustic and cultural metadata for the target may be retrieved from the metadata library if available. In cases where acoustic metadata for a new target is not available to be retrieved, acoustic metadata may be calculated from the target using the previously identified methods or any other known or future method for extracting acoustic metadata.

In cases where cultural metadata for the target is not available to be retrieved, at least some cultural metadata may be estimated from acoustic metadata. For example, published U.S. patent application US 2007/0240557 A1, previously incorporated herein by reference, describes (paragraphs 0024-0029 and 0042-0055 and the associated figures) a method for developing cultural metadata, in the form of a description vector, for a target from the acoustic characteristics of the target.

At 350, the acoustic and cultural metadata associated with the target may be compared with the acoustic and cultural metadata associated with the reference using a plurality of algorithms. The comparison at 350 may be weighted by user preferences 375. A technique for weighting the comparison will be described in detail subsequently. The comparison at 350 may produce a similarity result 385 which may be a value indicating the degree of similarity, on a predetermined scale, between the target and the reference. For example, the similarity result may be a number from 0 to 1 or from 0 to 100, wherein a value of zero indicates no similarity and the maximum value indicates a high degree of similarity approaching identity. The similarity results may be quantized, such as A/B/C/D/E, or may be compared to a predetermined threshold and converted to binary (Yes/No) form. The comparison process will be discussed in detail subsequently.

When responding to a request to search for a target that is similar to a reference, may be received at 320, the similarity result 385 may identify a track or a plurality of tracks that were determined to be similar to a reference. A similarity score may be provided for each identified track. The similarity score for each track may be a number, a letter grade, or some other score.

At 390, the similarity result 385 may be provided to the requester, and the process 300 may end at 395. Upon receipt of the similarity result, the requester may take one or more actions (not shown) based on the similarity result. For example, a music web site, having requested and received the similarity result, may communicate a recommendation to a user, or a user community, that the user either add, or not add, the target to their personal music collection. For further example, a user, having requested and received the similarity result, may elect to add, or not add, the target to a play list.

While the process 300 has been described in terms of a similarity server, such as the similarity server 140, the process 300 may also be performed by client computing device such as a personal computer. In the case of a client computing device, a request may be entered by a user at 320 using a keyboard or other input device. The similarity result may be provided to the user at 390 in the form of a presentation on a display device.

Figure 4:
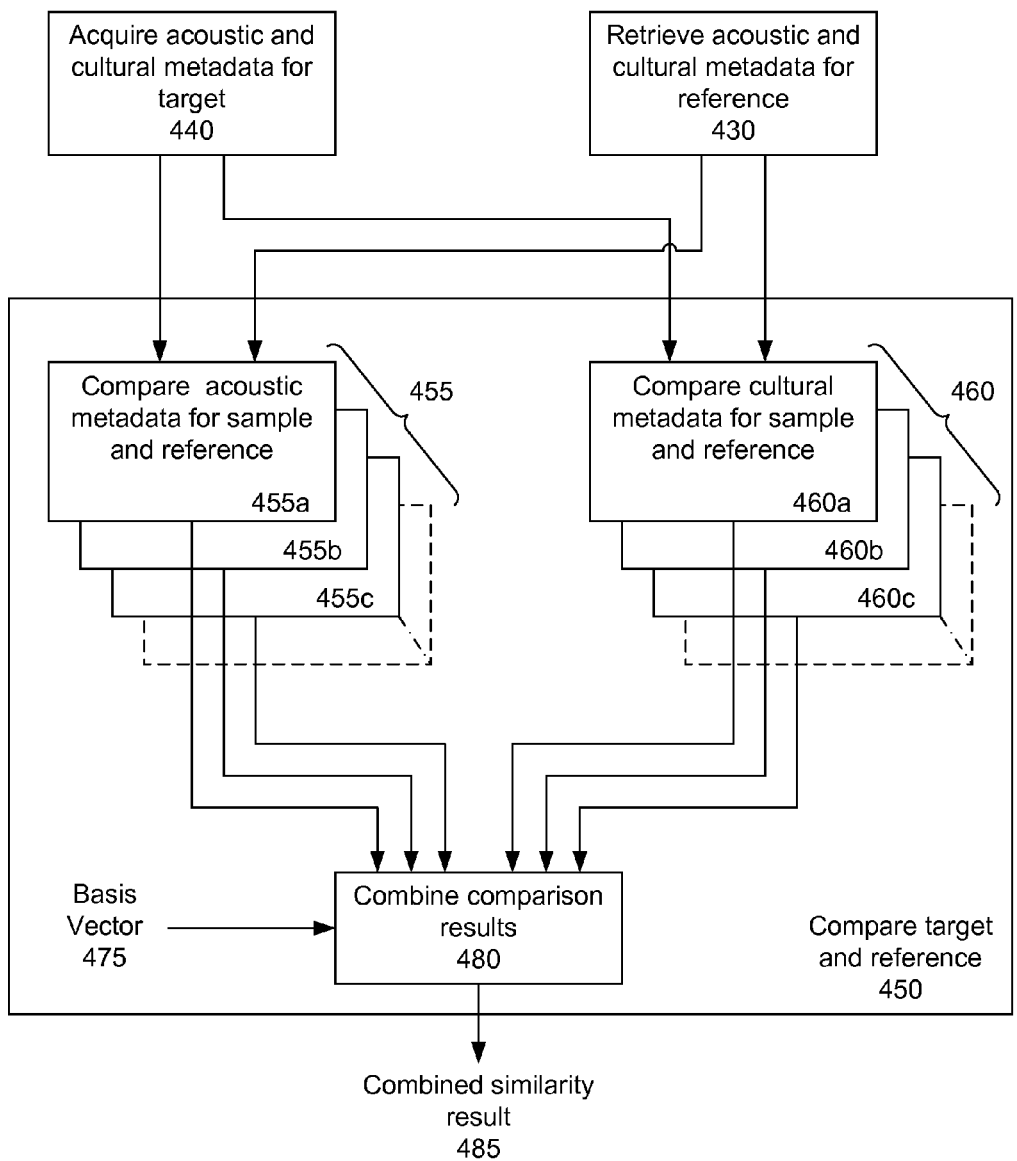
FIG. 4 is a flow chart of an exemplary process to compare metadata for a target and a reference.

FIG. 4 is a flow chart of an exemplary process 450 for comparing a target to a reference that may be suitable for use at 350 in the process 300. The process 450 operates upon acoustic and cultural metadata for the reference and the target acquired at 430 and 440, respectively.

At 455, the target may be compared with the reference using one or more algorithms 455a, 455b, 455c based on acoustic metadata. Each of the comparison algorithms 455a, 455b, 455c may result in an independent comparison score. Each comparison algorithm and the data being compared may be relatively simple or relatively complex. As an example of a simple comparison algorithm, the tempo of the target may be compared with the tempo of the reference. As an example of a complex comparison algorithm, copending patent application Ser. No. 12/061,374 (appropriate portions of which were previously incorporated herein by reference) describes a method for comparing acoustic metadata for two tracks, wherein each track is divided into segments, the spectral content of each segment is compressed into timbral vector, and a "timbral signature" of each track is calculated as the covariance matrix of the timbral vectors. The timbral signatures of the two tracks may are then compared. Other methods for comparing audio tracks are described in U.S. Pat. No. 7,013,301, and U.S. Pat. No. 7,277,776. These methods and other known or future methods for comparing a target to a reference based on acoustic metadata may be used at 455.

At 460, the target may be compared with the reference using one or more algorithms based on cultural metadata. Each of the comparison algorithms 460a, 460b, 460c may result in an independent comparison score. The comparison algorithms 460a, 460b, 460c may all be different. The comparison algorithms and the data being compared may be relatively simple or relatively complex. As an example of a simple comparison algorithm, the genre of the target may simply be compared with the genre of the reference. A more complex exemplary comparison algorithm may be to express cultural metadata as a description vector, where each term of the vector indicates the probability that a corresponding expression would be used to describe the associated track. The target and the reference may then be compared by calculating a Euclidean distance between a description vector for the target and a corresponding description vector for the reference. Multiple comparison algorithms may use the same approach but compare different description vectors. For example, description vectors derived from the content of music reviews and be compared separately from description vectors derived from chat rooms, and Web sites. These methods and other known or future methods for comparing a target to a reference based on cultural metadata may be used at 460.

At 880, a plurality of comparison scores from the comparison algorithms 455a, 455b, 455c, 460a, 460b, 460c may be combined. The plurality of comparison scores may first be normalized to a common scale. For example, each score could be normalized to a scale from 0 to 1 or 0 to 100, wherein a score of 0 indicates no similarity and a maximum score indicates a high degree of similarity, approaching identity. These scales could be inverted, such that a score of 0 indicated identity and a maximum score indicated a higher degree of difference. The comparison scores could then be stacked to form a score vector that may be multiplied by a basis vector 475 to provide a scalar combined comparison result 485.

The basis vector 475 may be unique to a specific user and, in essence, may capture the specific user's musical preferences. Each specific user may have an accumulated collection of music tracks that are presumed to have been selected based on that user's musical taste. Since each user selected the music in their music collection according to their personal taste, the tracks that make up each user's music collection are intrinsically similar according to the user's personal set of tangible and intangible criteria. The personal set of criteria may not be defined or definable, but may be reflected in the user's music collection. A method for developing a basis vector for a user will be described subsequently.

The comparison algorithms 455a, 455b, 455c, 460a, 460b, 460c may provide different degrees of accuracy predicting which target tracks may appeal to any specific user. The degree of accuracy of a given comparison algorithm for a specific user may be estimated by applying the given comparison algorithm the user's music collection. Specifically, it may be assumed that a first comparison algorithm that fails to detect any similarity between the tracks of a user's current music collection may not accurately predict whether a target track will, or will not, appeal to the user. Conversely, it may be assumed that that a second comparison algorithm that finds a high degree of similarity between the tracks of a user's current music collection may accurately predict whether a target track will, or will not, appeal to the user.

Thus the basis vector 475 may apply different weights to the plurality of comparison algorithms in proportion to how each algorithm judges the similarity of the tracks in the user's music collection. Algorithms that determine a higher degree of similarity in the user's music collection may receive a higher weight than algorithms that determine low or no similarity within the user's music collection. For example, a basis vector for one user may apply a high weight to the result from an algorithm that compares cultural metadata derived from music reviews. In contrast, the basis vector for another user may apply a high weight to the result from an algorithm that compares acoustic metadata derived from timbral content.

As illustrated in FIG. 4, the exemplary process for comparing a target to a reference 450 includes three algorithms 455a, 455b, 455c for comparing based on acoustic metadata and three algorithms 460a, 460b, 460c for comparing based on cultural metadata. A process for comparing a target to a reference may include more or fewer comparison algorithms based on either acoustic or cultural metadata, or both. A process for comparing a target to a reference may include at least one comparison algorithm based on acoustic metadata and at least one comparison algorithm based on cultural metadata.

Figure 5:
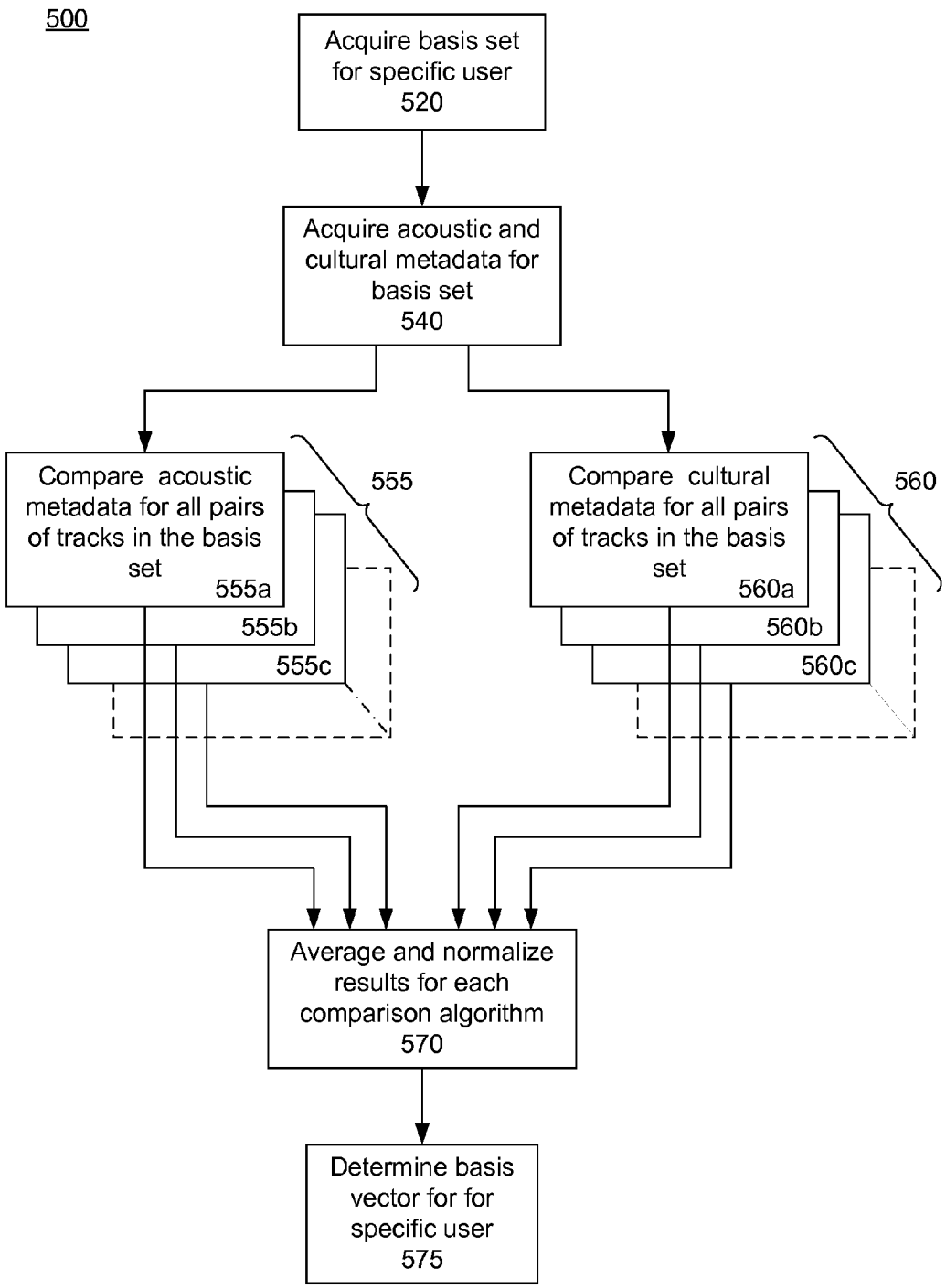
FIG. 5 is a flow chart of an exemplary process for determining a user-specific basis vector.

Referring now to FIG. 5, a process 500 for defining a basic vector for a specific user may begin at 520 where a basis set for the specific user may be acquired. The basis set for the specific user may be a plurality of tracks that reflect the specific user's musical preferences. The basis set may be, for example, the specific user's entire music collection. The basis set may be a user-selected portion of the user's music collection representative of the user's musical preferences. The basis set may be an automatically-selected portion of the user's music collection such as the 10, 20, 50, or other number of tracks that the user plays most frequently, or all of the tracks that the user played within the past month, three months, year, or other time period.

At 540, acoustic and cultural metadata for each track within the basis set may be acquired. The acoustic and cultural metadata may be retrieved from a metadata library, or may be calculated or otherwise developed as required.

At 555, the tracks within the basis set may be compared with each other using one or more algorithms based on acoustic metadata. To develop a basis vector compatible with the process 450, the algorithms used at 555 may be the same algorithms used at 455. For example, if the basis set includes 100 tracks, each track may be compared at 555 with each other track to produce (100×100)/2=5000 comparison scores for each algorithm based on acoustic metadata.

Similarly, at 560, the tracks within the basis set may be compared with each other using one or more algorithms based on cultural metadata. To develop a basis vector compatible with the process 450, the algorithms used at 560 may be the same algorithms used at 460. Continuing the example from the previous paragraph, if the basis set includes 100 tracks, each track may be compared with each other track at 560 to produce (100×100)/2=5000 comparison scores for each algorithm based on cultural metadata.

At 570, the multiple comparison scores (5000 in the previous example) for each comparison algorithm may be averaged to provide an average score for each algorithm. The plurality of average scores may be normalized to a common scale. For example, each score may be normalized to a scale from 0 to 1 or from 0 to 100, wherein a score of 0 indicates no similarity and a maximum score indicates a high degree of similarity, approaching identity.

At 575, the normalized average scores may then be scaled by dividing each normalized average score by the sum of all of the normalized average scores. The scaled scores may then be stacked to form a basis vector which may be used as the basis vector 475 in the comparison process 450. Each term of the basis vector may indicate, on a relative scale, the degree of similarity that the corresponding comparison algorithm determined between the tracks in the basis set. Thus each term of the basis vector may be used to apply an appropriate weight to the corresponding comparison algorithms when the results of a plurality of comparison algorithms are combined. Comparison algorithms that determine a higher degree of similarity within a user's music collection may receive a higher weight that comparison algorithms that find lower similarity within the user's music collection.

For example, the terms in a basis vector for a user with a highly diverse music collection may be nearly equal. Thus a plurality of comparison algorithms may be weighted nearly equally. In contrast, the basis vector for a user with a strong preference for music with a fast tempo may provide a high weight for an algorithm that only compares the tempos of a target and a reference. The basis vector for a user with a large collection of baroque trumpet concertos may provide a high weight for an algorithm that compares the timbral content of a target and a reference, since such an algorithm may identify targets having the unique timbral (or harmonic) structure produced by a piccolo trumpet.

An initial basis vector for a user may be developed using the process 500. The terms or weights in the basis vector may change over time in response to the user's interaction with a music analysis or recommendation system.

Closing Comments

Throughout this patent, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. A method for determining a similarity of a target music collection and a reference music collection with respect to a specific user, comprising:

comparing metadata associated with the target music collection and metadata associated with the reference music collection using a plurality of comparison algorithms including at least one comparison algorithm based on acoustic metadata and at least one comparison algorithm based on cultural metadata, each comparison algorithm producing a result automatically developing a basis vector from a basis set, the basis set including a plurality of audio tracks representative of the specific user's musical preferences, the basis set being all or a portion of the specific user's music collection, wherein automatically developing the basis vector comprises:

comparing each track in the basis set to each other track in the basis set using each of the plurality of comparison algorithms averaging the results for each comparison algorithm scaling the averaged results to form the basis vector weighting the results of the two or more comparison algorithms using the basis vector combining the weighted results of the two or more comparison algorithms.

2. The method of claim 1, further comprising
receiving a request from a requestor to compare the target music collection and the reference music collection
reporting the combined results to the requestor.

3. The method of claim 1, wherein the comparing, weighting, and combining are done automatically without user intervention.

4. The method of claim 1, wherein the reference music collection is all or a portion of the specific user's music collection.

5. The method of claim 1, wherein the at least one comparison algorithm based on acoustic metadata is a plurality of comparison algorithms based on acoustic metadata.

6. The method of claim 1, wherein the target music collection is one of a first track, a first album, and a first plurality of tracks.

7. A storage medium having instructions stored thereon which, when executed by a processor, will cause the processor to perform actions comprising:
comparing metadata associated with a target music collection and metadata associated with a reference music collection using a plurality of comparison algorithms including at least one comparison algorithm based on acoustic metadata and at least one comparison algorithm based on cultural metadata, each comparison algorithm producing a result
automatically developing a basis vector from a basis set, the basis set including a plurality of audio tracks representative of the specific user's musical preferences, the basis set being all or a portion of the specific user's music collection, wherein automatically developing the basis vector comprises:
comparing each track in the basis set to each other track in the basis set using each of the plurality of comparison algorithms
averaging the results for each comparison algorithm
scaling the averaged results to form the basis vector
weighting the results of the two or more comparison algorithms using the basis vector
combining the weighted results of the two or more comparison algorithms.

8. The storage medium of claim 7, the actions performed further comprising
receiving a request from a requestor to compare the target music collection and the reference music collection
reporting the combined results to the requestor.

9. The storage medium of claim 7, wherein the comparing, weighting, and combining are done automatically without user intervention.

10. The storage medium of claim 7, wherein the reference music collection is all or a portion of the specific user's music collection.

11. The storage medium of claim 7, wherein the at least one comparison algorithm based on acoustic metadata is a plurality of comparison algorithms based on acoustic metadata.

12. The storage medium of claim 7, wherein the target music collection is one of a first track, a first album, and a first plurality of tracks.

13. A computing device for comparing music, comprising:
a processor
memory coupled to the processor
a storage device storing instructions that, when executed by the processor, cause the computing device to perform actions comprising:
receiving a request from a requestor, the request identifying a target music collection, a reference music collection, and a specific user
comparing metadata associated with the target music collection and metadata associated with the reference music collection using a plurality of comparison algorithms including at least one comparison algorithm based on acoustic metadata and at least one comparison algorithm based on cultural metadata, each comparison algorithm producing a result
deriving a basis vector specific to the user from a basis set including audio tracks representative of the specific user's musical preferences, the basis set being all or a portion of the specific user's music collection, wherein deriving the basis vector comprises:
comparing each track in the basis set to each other track in the basis set using each of the plurality of comparison algorithms
averaging the results for each comparison algorithm
scaling the averaged results to form the basis vector
weighting the results of the plurality of comparison algorithms using the basis vector
combining the weighted results of the plurality of comparison algorithms
providing the combined weighted result to the requestor.

14. The computing device of claim 13, wherein the target music collection is one of a track, an album, and a plurality of tracks.

15. The computing device claim 14, wherein the reference music collection is all or a part of the specific user's music collection.

16. A method of recommending music, comprising:
a web server sending a request to a similarity server, the request identifying a target music collection, a reference music collection, and a specific user
the similarity server determining the similarity between the target music collection and the reference music collection with respect to the specific user, wherein determining further comprises:
comparing metadata associated with the target music collection and metadata associated with the reference music collection using a plurality of comparison algorithms including at least one comparison algorithm based on acoustic metadata and at least one comparison algorithm based on cultural metadata, each comparison algorithm producing a result
developing a basis vector from a basis set, the basis set including a plurality of audio tracks representative of the specific user's musical preferences, the basis set being all or a portion of the specific user's music collection, wherein automatically developing the basis vector comprises:
comparing each track in the basis set to each other track in the basis set using each of the plurality of comparison algorithms
averaging the results for each comparison algorithm
scaling the averaged results to form the basis vector
weighting the results of the plurality of comparison algorithms using the basis vector
combining the weighted results of the plurality of comparison algorithms to produce a similarity result
the similarity server providing the similarity result to the web server
the web server determining to recommend, or not recommend, the target music collection to the specific user based on the similarity result.

* * * * *

UNITED STATES PATENT AND TRADEMARK OFFICE
CERTIFICATE OF CORRECTION

PATENT NO.         : 8,073,854 B2                                          Page 1 of 1
APPLICATION NO.    : 12/101013
DATED              : December 6, 2011
INVENTOR(S)        : Whitman et al.

It is certified that error appears in the above-identified patent and that said Letters Patent is hereby corrected as shown below:

Column 12, line 29: replace "device claim" with --device of claim--.

Signed and Sealed this
Thirty-first Day of January, 2012

David J. Kappos
*Director of the United States Patent and Trademark Office*